United States Patent
Brown et al.

(10) Patent No.: US 7,406,990 B2
(45) Date of Patent: *Aug. 5, 2008

(54) RUNFLAT TIRE WITH SIDEWALL COMPONENT CONTAINING HIGH STRENGTH GLASS BUBBLES

(75) Inventors: Andrew David Brown, Columbia, MD (US); David John Zanzig, Bertrange (LU); Bina Patel Botts, Cuyahoga Falls, OH (US); David Mark Frantz, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 86 days.

This patent is subject to a terminal disclaimer.

(21) Appl. No.: 11/200,559

(22) Filed: Aug. 10, 2005

(65) Prior Publication Data

US 2007/0034311 A1    Feb. 15, 2007

(51) Int. Cl.
B60C 17/00 (2006.01)
B60C 17/04 (2006.01)
B60C 17/06 (2006.01)
B60C 11/00 (2006.01)

(52) U.S. Cl. ........................ 152/516; 152/517; 152/520; 152/209.1; 152/209.8; 152/209.14

(58) Field of Classification Search ........................ None
See application file for complete search history.

(56) References Cited

U.S. PATENT DOCUMENTS

| | | | |
|---|---|---|---|
| 3,764,455 A | 10/1973 | Lovell et al. | 161/162 |
| 4,767,726 A | 8/1988 | Marshall | 501/33 |
| 4,913,209 A * | 4/1990 | Hong et al. | 152/504 |
| 5,055,347 A | 10/1991 | Bacon, Jr. | 428/250 |
| 5,395,891 A | 3/1995 | Obrecht et al. | 525/194 |
| 5,504,135 A | 4/1996 | Ardrizzi et al. | 524/484 |
| 5,591,279 A | 1/1997 | Midorikawa et al. | 152/209 R |
| 5,648,420 A * | 7/1997 | Fujiwara et al. | 524/750 |
| 5,672,693 A | 9/1997 | Kawahara | 536/17.9 |
| 5,851,323 A * | 12/1998 | Kaido et al. | 152/510 |
| 6,103,808 A | 8/2000 | Hashimoto | 524/484 |
| 6,127,488 A | 10/2000 | Obrecht et al. | 525/333.3 |
| 6,133,364 A | 10/2000 | Obrecht et al. | 524/495 |
| 6,146,520 A | 11/2000 | Gupte et al. | 208/322 |
| 6,207,757 B1 | 3/2001 | Obrecht et al. | 525/194 |
| 6,242,534 B1 | 6/2001 | Obrecht et al. | 525/191 |
| 6,245,860 B1 | 6/2001 | Materne et al. | 525/331.8 |

(Continued)

FOREIGN PATENT DOCUMENTS

EP    0 839 891    5/1998

(Continued)

OTHER PUBLICATIONS

3M Scotchlite Glass Bubbles HGS Series Product Information.

(Continued)

*Primary Examiner*—Justin Fischer
(74) *Attorney, Agent, or Firm*—John D. DeLong

(57) ABSTRACT

A pneumatic runflat tire comprising a sidewall component comprising a rubber composition comprising at least one diene based elastomer and from about 1 to about 40 phr of glass bubbles having a crush strength of at least 10,000 psi as measured by ASTM D3102-78 in glycerol.

6 Claims, 3 Drawing Sheets

U.S. PATENT DOCUMENTS

| | | | |
|---|---|---|---|
| 6,248,929 B1 | 6/2001 | Kaimai et al. | 585/241 |
| 6,372,857 B1 | 4/2002 | Obrecht et al. | 525/332.6 |
| 6,399,697 B1 | 6/2002 | Takasaki et al. | 524/575 |
| 6,410,816 B2 | 6/2002 | Takasaki et al. | 585/833 |
| 6,608,125 B2 | 8/2003 | Cruse et al. | 524/262 |
| 6,626,216 B2 | 9/2003 | Minagoshi | 152/209.4 |
| 6,699,921 B2 * | 3/2004 | Ikeda | 524/236 |
| 6,890,981 B1 * | 5/2005 | Luginsland | 524/262 |
| 2001/0007049 A1 | 7/2001 | Takasaki et al. | 585/833 |
| 2001/0023307 A1 | 9/2001 | Kaimai et al. | 585/241 |
| 2002/0000280 A1 | 1/2002 | Scholl | 152/519 |
| 2002/0045697 A1 | 4/2002 | Sohnen et al. | 524/492 |
| 2003/0130535 A1 | 7/2003 | Deschler et al. | 556/413 |
| 2004/0112496 A1 | 6/2004 | Colantonio et al. | 152/510 |
| 2004/0220321 A1 | 11/2004 | Bataille et al. | 524/493 |

FOREIGN PATENT DOCUMENTS

| | | | |
|---|---|---|---|
| ES | 2122917 | | 12/1998 |
| JP | 04362405 | | 12/1992 |
| JP | 06-040211 | * | 2/1994 |
| JP | 07215018 | | 8/1995 |
| JP | 2002088198 | | 3/2002 |
| JP | 2002097369 | | 4/2002 |
| JP | 2002127719 | | 5/2002 |

OTHER PUBLICATIONS

3M Microspheres Selection Guide.
3M Scotchlite Glass Bubbles S60/18000 For Injection Molded and Extruded Polymers Application Information.
European Search Report.

* cited by examiner

RUNFLAT TIRE WITH SIDEWALL COMPONENT CONTAINING HIGH STRENGTH GLASS BUBBLES

BACKGROUND OF THE INVENTION

The desire for improved fuel efficiency in automobiles, trucks, aircraft and the like has led to the need for more fuel efficient tires. One way in which tires can be more fuel efficient is through reduced weight of the tires. It is therefore desirable to reduce the weight of tires while maintaining the physical properties and performance of the various tire components.

SUMMARY OF THE INVENTION

The present invention is directed to a pneumatic runflat tire comprising a sidewall component comprising a rubber composition comprising at least one diene based elastomer and from about 1 to about 40 phr of glass bubbles having a crush strength of at least 10,000 psi as measured by ASTM D3102-78 in glycerol. Use of such glass bubbles in the sidewall components allows reduction in the weight of the component while maintaining desirable physical properties.

DETAILED DESCRIPTION OF THE INVENTION

Figure 1:
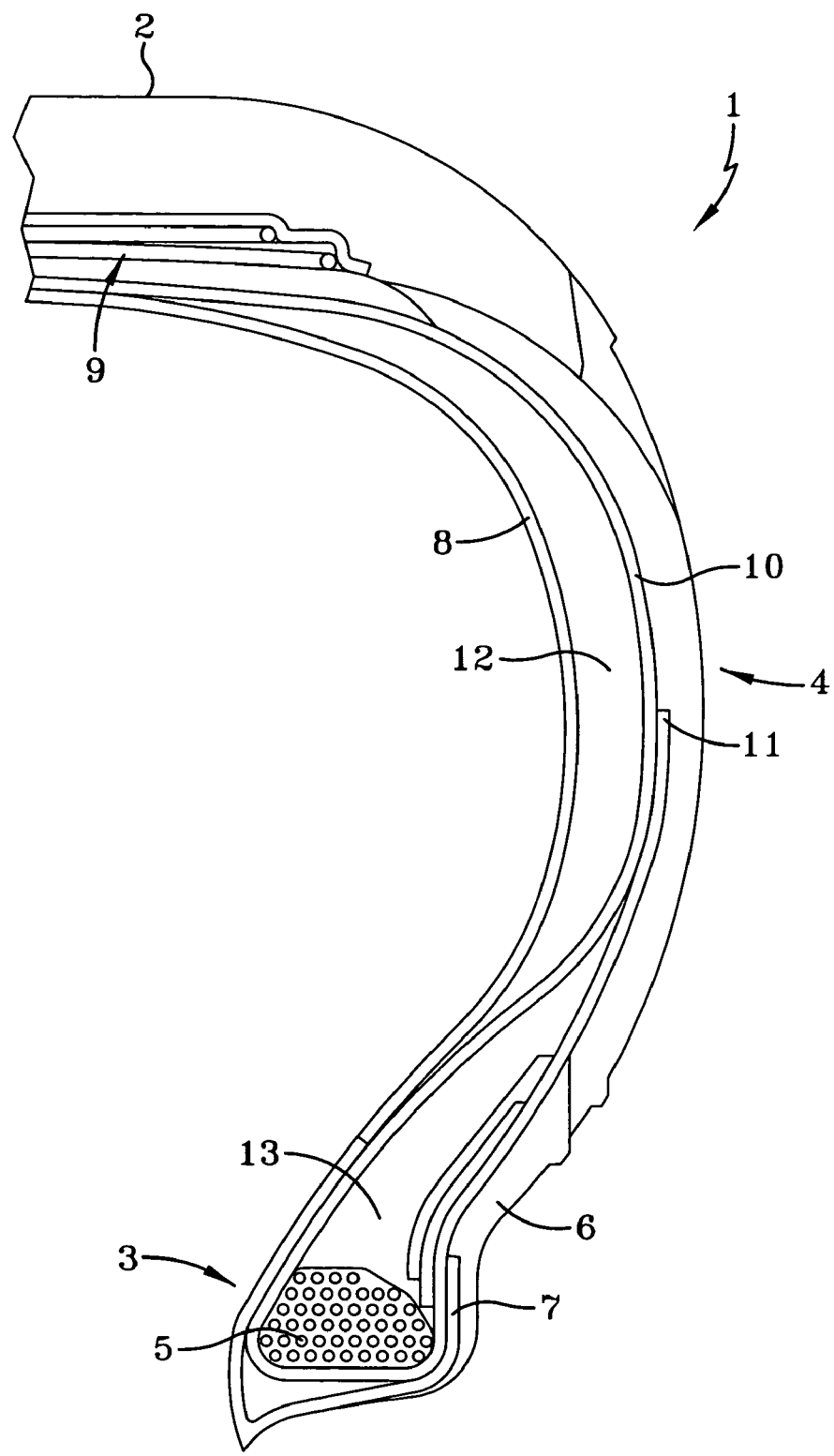
FIG. 1 is a fragmentary cross-sectional view of a tire showing its tread and carcass with one ply and one insert axially inward of the ply in the sidewall region of the tire as an embodiment of the invention.

There is disclosed a pneumatic runflat tire comprising a sidewall component comprising a rubber composition comprising at least one diene based elastomer and from about 1 to about 40 phr of glass bubbles having a crush strength of at least 10,000 psi as measured by ASTM D3102-78 in glycerol.

In one embodiment, the sidewall component may be a runflat insert or an apex. Such runflat inserts and apexes are intended to provide support to the sidewall during a deflation event.

The pneumatic tire of the present invention contains glass bubbles having a crush strength of at least 10,000 psi as measured by ASTM D3102-78 in glycerol. In another embodiment, the tire contains glass bubbles having a crush strength of at least 18,000 psi as measured by ASTM D3102-78 in glycerol. The amount glass bubbles may vary. In one embodiment, the level ranges from 1 to 40 phr. In another embodiment, the level of glass bubbles ranges from 3 to 30 phr.

Suitable glass microbubbles may be produced by a method as described in U.S. Pat. No. 4,767,726. Suitable glass microbubbles are available commercially as Scotchlite HGS Series, S60 and S60/HS glass microbubbles from 3M Specialty Materials of St. Paul, Minn. In one embodiment, the glass microbubbles may be comprised of chemically-stable soda-lime borosilicate glass in the form of hollow glass spheres. In one embodiment, the glass microbubbles have a particle size distribution of 10 percent by weight of 15 microns or less, 50 percent by weight of 30 microns or less, 90 percent by weight of 55 microns or less, and 95 percent by weight of 65 microns or less. In another embodiment, the particle size distribution may be 10 percent by weigh of 11 microns or less, 50 percent by weight of 30 microns or less, 90 percent by weight of 50 microns or less, and 95 percent by weight of 60 microns or less. In one embodiment, the glass bubbles have 1 percent or less by weight of particles with a size greater than 149 microns.

While not wishing to be bound by any particular theory, it is believed that the strength of the glass bubbles is significant so they will survive rubber compounding and processing without breaking. It is believed that survival of the glass bubbles is important to weight reduction in the sidewall component, because if the glass bubbles fracture during compounds and processing, then the objective of lowered compound weight in not achieved.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, vegetable oils, and low PCA oils, such as MES, TDAE, SRAE and heavy naphthenic oils.

In one embodiment, the rubber composition includes a low PCA oil. Suitable low PCA oils include but are not limited to mild extraction solvates (MES), treated distillate aromatic extracts (TDAE), and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy napthenic oils generally have a Tg in a range of from about −42° C. to about −48° C.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

In one embodiment, the low PCA oils may be an MES, TDAE or heavy napthenic types having characteristics as identified in the following table.

|  | MES | TDAE | Heavy Naphthenic |
|---|---|---|---|
| Aromatics % (2140) | 11-17 | 25-30 | 11-17 |
| Spec. Gravity @ 15° C. [kg/l] | 0.895-0.925 | 0.930-0.960 | 0.920-0.950 |
| Visc. 40° C. (cSt) | 150-230 | 370-430 | 350-820 |
| Visc. 100° C. (cSt) | 13-17 | 16-22 | 17-33 |
| Visc. Gravity Const. | 0.825-0.865 | 0.860-0.890 | 0.840-0.870 |
| Refractive Index | 1.495-1.510 | 1.520-1.540 | 1.500-1.520 |
| Tg [° C.]/inflection | −60 ± 3 | −47 ± 3 | −45 ± 3 |
| Aniline Point [° C.] | 85-100 |  |  |
| Pour Point [° C.] | 0 max | 30 max | 0 max |
| DMSO [%, IP 346] | <2.9 | <2.9 | <2.9 |
| Flashpoint [° C.] | >220 | >240 | >240 |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy naphthenic oils are available as Shellflex 794, Ergon Black Oil C1, Ergon Black Oil C2, Ergon H2000, Cross C2000, Cross C2400, and San Joaquin 2000L. Suitable SRAE oil includes NC140 from Japan Energy Corp. The oils may be available as the oil alone or along with an elastomer in the form of an extended elastomer.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 10 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z 1165MP and Z165GR and silicas available from Degussa AG with, for example, designations VN2 and VN3, etc.

The vulcanizable rubber composition may include from 1 to 100 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

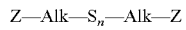

in which Z is selected from the group consisting of

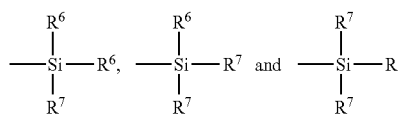

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis (trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl) disulfide and 3,3'-bis(triethoxysilylpropyl) tetrasulfide. Therefore, as to formula II, Z may be

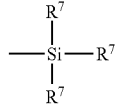

where R$^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G—C(=O)—S—CH$_2$CH$_2$CH$_2$SiX$_3$ wherein each X is an independently selected RO—group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas III or IV

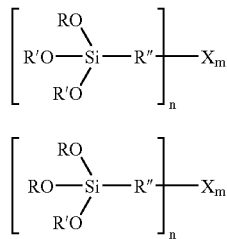

wherein: R is a methyl or ethyl group;

R' is identical or different and is a C$_9$C$_{30}$ branched or unbranched monovalent alkyl or alkenyl group, aryl group, aralkyl group, branched or unbranched C$_2$-C$_{30}$ alkyl ether group, branched or unbranched C$_2$-C$_{30}$ alkyl polyether group or R'''$_3$Si, where R''' is C$_1$-C$_{30}$ branched or unbranched alkyl or alkenyl group, aralkyl group or aryl group, R'' is a branched or unbranched, saturated or unsaturated, aliphatic, aromatic or mixed aliphatic/aromatic divalent C$_1$-C$_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), C(CH$_3$)$_2$, CH(C$_2$H$_5$), CH$_2$CH$_2$CH(CH$_3$), CH$_2$CH(CH$_3$)CH$_2$ or

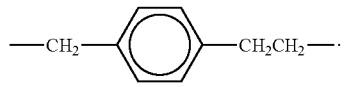

In one embodiment, the sulfur containing organosilicon compound is of formula III, R is ethyl, R' is C$_{12}$-C$_{14}$ alkyl, R'' is CH$_2$CH$_2$CH$_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

Tires containing the inserts of this invention can be comprised of a toroidally-shaped carcass and an outer, circumferential tread designed to be ground-contacting, wherein said carcass is comprised of two spaced-apart inextensible bead portions, two spaced-apart sidewalls each individually extending radially inward from and connecting said tread to said bead potions and at least one cord reinforced ply extending from bead to bead and through the sidewalls; an improvement in which a substantially crescent-shaped rubber insert is juxtapositioned to and axially inward of at least one of said carcass plies in each of said sidewalls of the tire.

It is to be appreciated that the insert is sulfur co-cured with the tire assembly of said tread and carcass as a whole. Preferably, the insert(s) have a maximum thickness at a location about midway between the bead portions and the tread in the sidewall region of the tire.

In the practice of this invention, a significant function of the rubber composition-based fillers in the sidewall portion of the tire is to stiffen/support the sidewall structure when the tire is operated without inflation pressure.

The rubber composition-based inserts are elastomeric in nature having a substantially crescent cross-sectional shape and material properties selected to enhance inflated ride performance while promoting the tire's run-flat durability. The inserts, if desired, may also be individually reinforced with cords or short fibers. Thus, one or more of such inserts may be so-reinforced.

The shape of the insert is described as being substantially crescent in shape. This is intended to also include an entrunkated crescent shape, particularly where the entrunkated portion of the crescent-shaped insert is juxtapositioned to the tire's bead portion.

In further practice of the invention, said tire carcass may have from one to three plies comprised of a first axially inner ply and optionally one or two additional plies as a second ply and third ply, respectively; each additional ply positioned sequentially axially outward from said first ply in the sidewall region of the tire.

Accordingly, in accordance with this invention, said tire contains one ply in its carcass wherein said insert is juxtapositioned to and axially inward of said ply in the sidewall region of the tire.

In further accordance with this invention, said tire contains, in its carcass, an axially inner first ply and a second ply axially outward from the first ply; wherein said insert is juxtapositioned to and axially inward of said first ply, in the sidewall region of the tire.

In additional accordance with this invention, said tire contains, in its carcass, an axially inner first ply and an axially outer second ply; wherein said insert is juxtapositioned to and interposed between said first and second ply, in the sidewall region of the tire.

In further accordance with this invention, said tire contains, in its carcass, an axially inner first ply and an axially outer second ply; wherein one of said inserts is juxtapositioned to and interposed between said first and second ply, in the sidewall region of the tire, and another of said inserts is juxtapositioned to and axially inward of said first ply, in the sidewall region of the tire.

In further accordance with this invention, said tire contains, in its carcass, an axially inner first ply, a second ply axially outward from said first ply and a third ply axially outward from said second ply; wherein said insert is juxtapositioned to and axially inward of said first ply, in the sidewall region of the tire.

In additional accordance with this invention, said tire contains, in its carcass, an axially inner first ply, a second ply axially outward from said first ply and a third ply axially outward from said second ply; wherein said insert is juxtapositioned to and interposed between (a) said first and second plies and/or (b) said second and third plies, in the sidewall region of the tire.

In further accordance with this invention, said tire contains, in its carcass, an axially inner first ply, a second ply axially outward from said first ply and a third ply axially outward from said second ply; wherein said insert is juxtapositioned to and interposed between (a) said first and second plies and/or (b) said second and third plies, in the sidewall region of the tire and, also, an insert juxtapositioned to and axially inward of the innermost of said plies.

In one embodiment, the innermost ply, or plies, has synthetic or textile cord reinforcement of polyester, nylon, rayon or aramid, preferably nylon; while the outermost ply preferably has aramid, rayon, carbon fiber, fiberglass or metal cord reinforcement, preferably brass and/or zinc-coated steel cords.

Thus, in a preferred embodiment, the first ply has reinforcing cords of rayon and the second and additional plies are cords of rayon.

The term "ply" is contemplated to include cord reinforced inserts which do not extend entirely from one bead core to the opposite bead core. It is, however, contemplated that at least one ply must extend from bead core to the opposite bead core, preferably a radial ply. A second ply can extend from a bead core to just laterally under one or more of the reinforcing belts of the belt structure.

In one aspect, the outermost ply preferably has cords of a higher modulus (i.e., steel cords) and the innermost ply, or plies, have cords of a lower modulus (i.e., nylon or rayon).

At least one ply, preferably the innermost ply, extended from bead core to bead cord and wraps around the bead core.

Alternatively, where two or more plies are used, at least one of the additional plies, while extending from bead core to bead core, does not actually wrap around the bead core.

Figure 2:
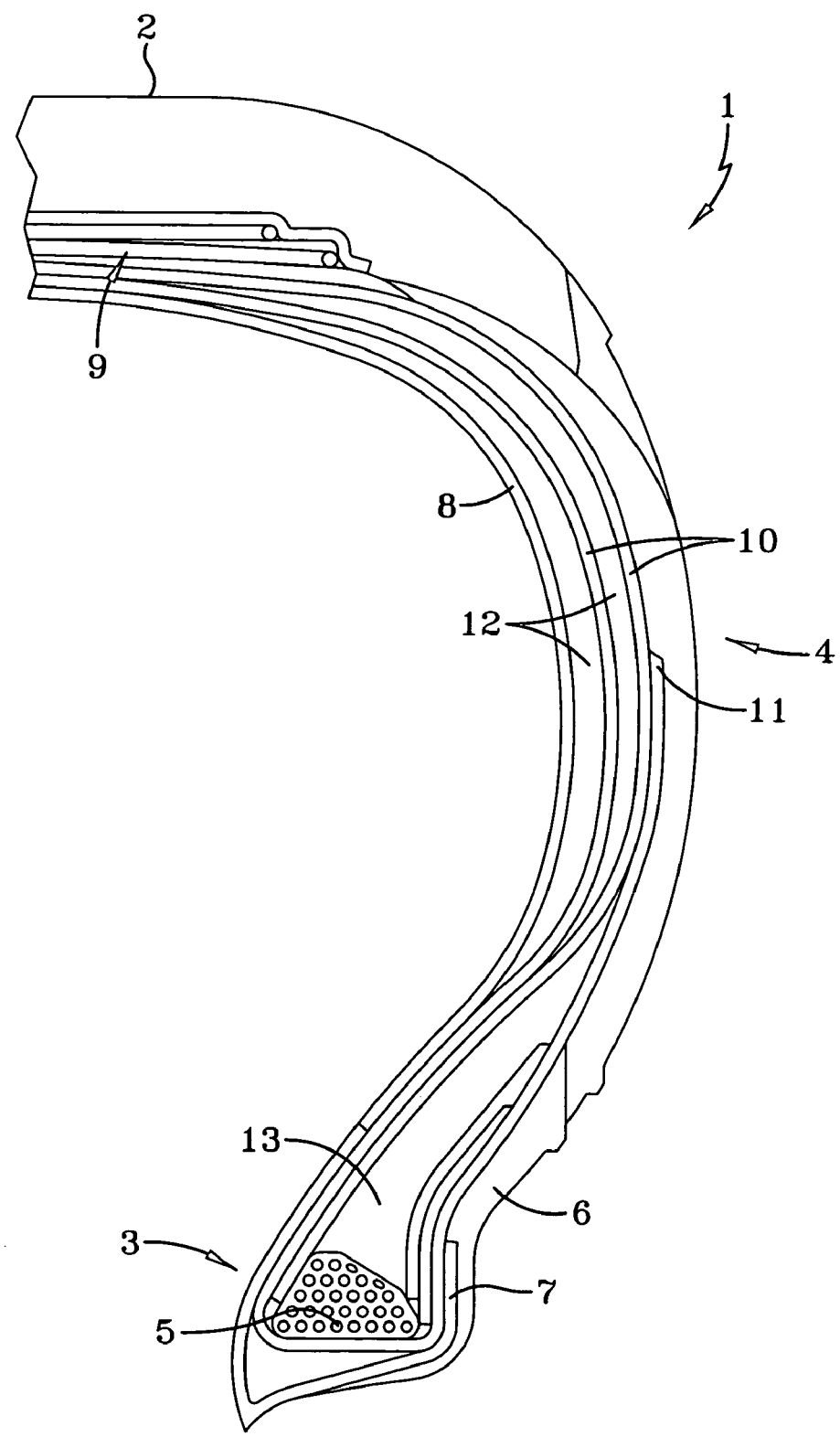
FIG. 2 is a fragmentary cross-sectional view of a tire showing its tread and carcass with two plies, a second insert interposed between the plies and a second ply axially outward of the innermost ply in the sidewall region of the tire as an embodiment of the invention.
Figure 3:
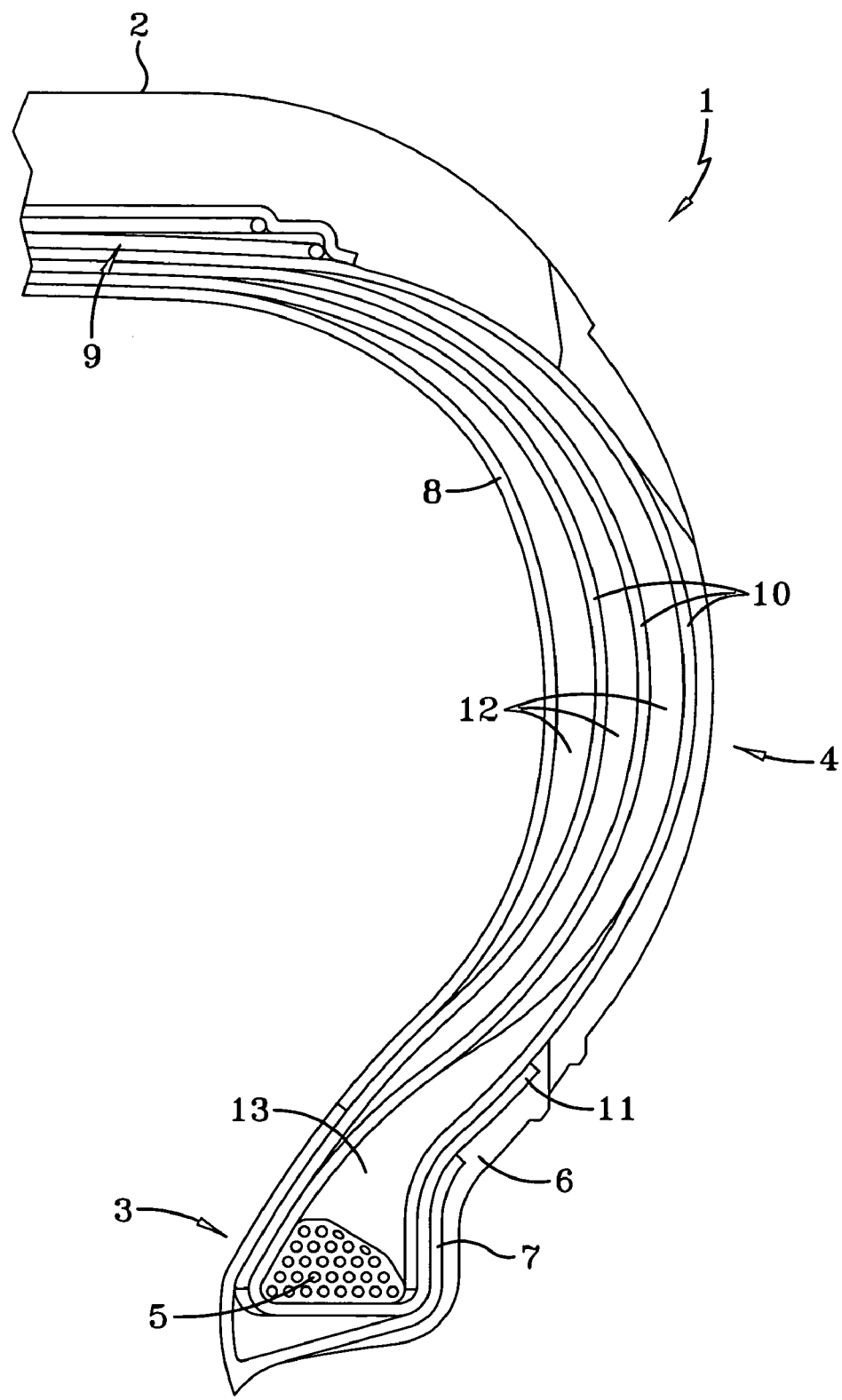
FIG. 3 is a fragmentary cross-sectional view of a tire showing its tread and carcass with three plies, inserts between the plies and another insert axially inward of the innermost ply in the sidewall region of the tire as an embodiment of the invention.

Referring to the drawings, FIGS. 1, 2 and 3 show the fragmentary cross-section of a tire 1, its tread 2, bead portion 3, sidewall or sidewall region 4, inextensible wire bead core 5, rubber chafer 6, rubber toeguard 7, rubber composition innerliner 8, belt structure 9 underlying a portion of the tread 2, carcass ply 10, carcass ply turnup 11, insert 12 and apex 13.

The rubber composition including the glass bubbles may be used in one or more of the inserts 12 and apex 13.

The cords for use in the carcass plies may comprise from one (monofilament) to multiple twisted filaments. The number of total filaments in the cord may range from 1 to 13. The cords, particularly metallic cords, of the carcass ply are generally oriented such that the tire according to the present invention is what is commonly referred to as a radial.

The cord of the carcass ply intersect the equatorial plane (EP) of the tire at an angle in the range of from 75° to 105°. Preferably, the cords intersect at an angle of from 82° to 98°. A more preferred range is from 89°to 91°.

The first and second reinforcing ply structure each may comprise a single ply layer; however, any number of carcass plies may be used. As further illustrated in the Figures, the first ply structure has a pair of turnup ends respectively which wrap about each bead core 5 of the bead portion 3 of the carcass. The ends 11 of the second ply 10 are in proximity to the bead core 5 and terminate radially adjacent on either side of the bead core 5, above the bead core 5 or can be wrapped around the bead core 5 and terminates radially below the turnup end 11 of the first ply 10 as shown. The turnup ends 11 of the first ply 10 wrap about the second ply ends and the bead core 5. The turnup ends of the first ply 11 terminates radially a distance above the nominal rim diameter of the tire 1 in proximity to the radial location of the maximum section width of the tire. In a preferred embodiment, the turnup ends are located within 20 percent of the section height of the tire from the radial location of the maximum section width, most preferably terminating at the radial location of the maximum section width.

The bead core 5 is preferably constructed of a single or monofilament steel wire continuously wrapped. Located within the bead region 3 and the radially inner portions of the sidewall portions 4 are high modulus elastomeric apex inserts disposed between carcass reinforcing structure 11 and the turnup ends 11, respectively. The elastomeric apex inserts 13 extend from the radially outer portion of bead portions respectively, up into the sidewall portion gradually decreasing in cross-sectional width. The elastomeric apex inserts 13 terminate at a radially outer end.

The inserts 12 may extend from each bead region radially to the edge of the tread, usually to just beneath the reinforcing belt structures 9. As illustrated in the Figures, the sidewall portions may each include a first insert 12 and a second insert 12 and even a third insert 12. The first inserts 12 are positioned as described above. The second inserts 12 are located (interposed) between the first and the second plies 10, respectively. The second insert 12 extends from each bead region 3, or portion, radially outward to the edge of the tread 2, namely, to just beneath the reinforcing belt structure 9.

In one embodiment, the first inserts 10 each have a thickness at its maximum thickness of at least three percent of the maximum section height "SH" at a location approximately radially aligned to the maximum section width of the tire.

The second insert, and third insert, if used, has a thickness at its maximum thickness of at least one and one-half percent (1.5%) of the maximum section height of the tire at the location radially above the maximum section width of the tire. In a preferred embodiment, the elastomeric second inserts, and third insert, if used, each have a thickness of approximately one and one-half percent (1.5%) of the maximum section height SH of the tire at a radial location of about 75 percent of the section height SH. For example, in a P275/40ZR17-size high performance tire, this thickness of the second insert of the tire equals 0.08 inches (2 mm). At the location approximately radially aligned with the location of the maximum section width of the tire, the thickness of the second insert is 0.05 inches (1.3 mm).

The overall cross-sectional thickness of the combination of elastomeric inserts preceding from the bead portions to the radial location of the maximum section width (SW) is preferably of constant thickness. The overall sidewall and carcass thickness is at least 0.45 inches (11.5 mm) at the maximum section width location and increases to an overall thickness in the region where it merges into the shoulder near the lateral tread edges. Preferably, the overall thickness of the sidewall in the shoulder region of the tire is at least one hundred percent (100%) of the overall sidewall thickness at the maximum section width (SW). This ratio means that the sidewall can be made substantially thinner than the predecessor-type runflat tires.

As previously discussed, the tire of the present invention has at least one ply having a turnup end 11 (wrapped around the bead core 5) while another ply can simply be terminated adjacent to the bead core 5 without actually wrapping around the bead core 5.

The first insert 12 is preferably made of elastomeric material. The first insert 12 is designed to prevent the tire's sidewall from collapsing when operating under no inflation pressure. The insert 12 can be of a wide range of shore A hardnesses from a relative soft shore A of about 50 to very hard 85, and preferably from 70 to 80. The material shape and cross-sectional profile is modified to insure the ride performance and sidewall spring rate is acceptable. The cross-sectional area of the insert can be reduced without compromising performance characteristics by utilizing stiffer materials in the insert. Thus, weight can be reduced by using stiffer materials in the insert.

The second insert 12, and third insert 12, if used, can be of the same or different material physical properties relative to the first insert. This means that the combination of a hard second insert 12 , and/or third insert 12 , if used, with a softer first insert 12 is contemplated as well as the combination of a hard first insert 12 with a softer second and/or third insert 12 . The elastomeric materials of the second insert may similarly be in the 50 to 85 shore A range.

The second insert 12 and third insert 12 , if used, as shown in the Figures, is made of elastomeric material. These inserts 12 can be used in multiples of inserts interposed between adjacent plies when more than two plies are used in the carcass structure.

The second inserts 12, and third inserts 12, when used, act as a spacer between the adjacent plies. The cords of the plies particularly the radially outer ply is placed in tension when the tire is operated uninflated.

In practice, the rubber compositions for the inserts 12 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of inserts 12 and with plies 10 having a combination of either dissimilar or similar high stiffness yet essentially low hysteresis properties.

In particular, for the purposes of this invention, the aforesaid inserts 12 are designed to have a high degree of stiffness yet also having lower weight than for an inserts not containing the high strength glass bubbles.

The runflat tire containing the inserts of this invention can be built, shaped, molded and cured by various methods that will be readily apparent to those having skill in the art. In general, the runflat tires of this invention can be manufactured using standard techniques with, of course, the exception that the insert therein contains an antireversion agent in addition to the rubbery polymer.

In one embodiment, the insert of this invention is incorporated into a runflat tire of the design described in Ser. No. 10/317,341 filed Dec. 12, 2002, the teachings of which are incorporated herein by reference in their entirety. This design relates to a pneumatic tire capable of self-support during under-inflation and which has a modified inner liner construction, capable of providing comparable performance with previous self-supporting tires and having a reduced cost and improved uniformity and improved air retention due to a modified inner liner construction. The tire has a tread terminating in a pair of shoulders, a carcass structure comprising at least one radial carcass ply, two bead regions, and two sidewalls. Each sidewall has an upper sidewall portion that connects to the tread shoulders and each sidewall is reinforced by an insert. The insert assists in self-supporting during underinflated operation. There is also an air impermeable inner liner located radially inward of the carcass structure. In accordance with the invention, radially inward of the carcass ply is an insert liner that extends from one bead region to the opposing bead region. Because of the presence of the insert liner, the air impermeable liner extends only from a location radially inward of one upper sidewall to the opposing upper sidewall. The insert liner is preferably formed of a substantially similar, if not the same, material as the material forming the sidewall inserts. In another aspect of the invention, a second insert may be present in each sidewall. The actual design and number of inserts in the tire sidewalls may be of any known design and is dependent upon the performance characteristics of the tire. In another aspect of the invention, the tire has second and third air impermeable liners, each located in one bead region. The radially outer edge of each second and third air impermeable liners overlaps the ends of the insert liner. In such a construction, air impermeable liners are located in the most critical areas: under the tread and shoulders and around the bead regions. In another aspect of the invention, to prevent the tire sidewalls from becoming excessively heavy or too thick, the insert liner and the sidewall inserts have a combined maximum thickness in the range of 5 mm to 12 mm. The actual thickness will be determined by the actual tire size.

In another embodiment, the insert of this invention is incorporated into a runflat tire of the design described in Ser. No. 10/818,724, filed on Apr. 6, 2004, the teachings of which are incorporated herein by reference in their entirety. This design relates to a pneumatic self-supporting tire wherein the tire's construction is optimized for ride comfort performance. The tire construction acts to lower the tire amplification of any road irregularity into the vehicle suspension system, and thus to the car body. This results in a better ride comfort performance of the tire. The reduction of amplification is achieved through the addition of a compressible rubber layer located radially outward of the carcass reinforcing plies. The compressibility comes from a porosity designed in the rubber matrix. In accordance with the invention, disclosed is a pneumatic run-flat tire. The tire has at least one carcass reinforcing ply, at least one pair of sidewall wedge inserts, and a belt reinforcing structure. The belt reinforcing structure is formed from at least a pair of cross cord belt reinforcing plies. Located radially outward of the carcass reinforcing ply is a porous elastomeric layer. In various embodiments of the invention, the porous elastomeric layer is located directly adjacent to the carcass reinforcing plies, between the cross cord belt reinforcing plies, or radially outward of the cross cord belt reinforcing plies, either radially inward or radially outward of any zero degree overlay ply present in the tire. In one aspect of the disclosed invention, the porous elastomeric layer has a porosity level of 20 to 80%, preferably 40-70%, of the total volume of the porous elastomeric layer. The elastomer base of the porous layer may be the same elastomeric base used in any adjacent layer, thus assisting in bonding the porous layer to the adjacent ply layers in the tire. The porosity of the layer is achieving by adding a blowing agent to the elastomer during compounding of the elastomer. The blowing agent is activated during vulcanization of the elastomer, which may occur either during curing of the entire tire or during partial vulcanization of the layer prior to addition of the porous layer during building of the green tire. In another aspect of the invention, the porous elastomeric layer has a minimal axial width WC at least equal to 20% of the axial width WSB of the smallest width cross cord belt reinforcing ply. Preferably, the porous elastomeric layer has a minimal axial width WC at least equal to 60% of the axial width WSB of the smallest width cross cord belt reinforcing ply. The porous elastomeric layer has a maximum axial width WC at most equal to 115% of the axial width WB of the widest width cross cord belt reinforcing ply. Preferably, the porous elastomeric layer has a maximum axial width WC at most equal to 100% of the axial width WB of the widest width cross cord belt reinforcing ply. In another aspect of the present invention, the porous elastomeric layer has a radial thickness TC at least equal to 50% of the radial thickness TB, TP of either an adjacent carcass reinforcing ply or an adjacent cross cord belt reinforcing ply. Preferably, the porous elastomeric layer has a maximum radial thickness TC of at most three times the radial thickness TB, TP of either an adjacent carcass reinforcing ply or an adjacent cross cord belt reinforcing ply. In another aspect of the present invention, the tire tread is comprised of a tread cap layer and a tread base layer. In such a tire, the tread cap layer and the tread base layer are conventionally formed of different elastomers, each layer seeking to provide a specific characteristic to the tire tread. When such a tread construction is employed with the present invention, the porous elastomeric layer is located radially inward of the tread base layer. When the porous elastomeric layer is directly adjacent to any tread layers, the porous elastomeric layer is a distinct and different layer from the tread layers, and from any tread base layer located within the tire.

In still another embodiment of this invention, the insert is incorporated into a runflat tire disclosed in Ser. No. 11/017,123, filed Dec. 20, 2004, the teachings of which are incorporated herein by reference in their entirety. This design relates to an asymmetrical self-supporting pneumatic tire. Different ways are shown to obtain a tire with an asymmetrical behavior, capable of compensating for the asymmetrical effects of camber. Ultimately, all solutions aim at creating a difference in stiffness between the two sides of a tire. Only when the cambered side is less stiff than the opposite side, a balanced load distribution can be achieved on a suspension with a fixed camber. The asymmetrical effect being the more evident during underinflated operation, runflat durability can be significantly improved on a cambered suspension while inflated properties remain unchanged. Disclosed therein is a method of manufacturing an asymmetrical run-flat tire. The method includes the step of building a symmetrical green tire, the green tire having an equatorial plane (EP) and comprising a tread, a pair of opposing beads, at least one carcass reinforcing ply, a belt structure located radially outward of the carcass reinforcing ply, and a sidewall insert axially inward of at least one of the carcass reinforcing plies in a sidewall portion of the tire. The symmetrical green tire is cured in a mold having an asymmetrical configuration to form an asymmetrical cured tire. The cured tire has a pair of beads symmetrically distanced from the equatorial plane (EP) of the tire. The tread on each side of the equatorial plane of the tire has different radius of curvature and different widths, the widths being measured perpendicular to the equatorial plane to a line tangent to the maximum width of the belt structure. In one aspect of the disclosed method, each sidewall of the cured tire has a maximum width, as measured from the tire equatorial plane (EP) to the radially outer surface of the tire sidewall, and one sidewall has a width Ws greater than the width Ws' of the opposing sidewall. In another aspect of the disclosed method, one sidewall of the asymmetric cured tire has a width Ws in the range of 100 to 110% of the width Ws' of the opposing sidewall. In another aspect of the disclosed method, the symmetrical green tire is cured such that each sidewall of the cured tire has a maximum width, as measured from the tire equatorial plane to the radially outer surface of the tire sidewall, and the maximum width of one sidewall is radially outward of the maximum width of the opposing sidewall. Also disclosed herein is an asymmetric run-flat pneumatic tire. The tire has an equatorial plane (EP), a pair of opposing bead portions, a pair of opposing sidewalls, at least one carcass reinforcing ply, a sidewall insert axially inward of at least one of the carcass reinforcing plies in each sidewall portion, and a belt structure located radially outward of the carcass reinforcing plies. The bead portions of the tire are symmetrically distanced from the equatorial plane (EP) of the tire. The tread on each side of the equatorial plane (EP) have different radii of curvature and different widths, the widths being measured perpendicular to the equatorial plane (EP) to a line tangent to the maximum width of the belt structure.

In one aspect of the disclosed tire, each sidewall of the tire has a maximum width, as measured from the tire equatorial plane to the radially outer surface of the tire sidewall, and one sidewall has a width Ws greater than the width Ws' of the opposing sidewall. Preferably, one sidewall has a width Ws in the range of 100 to 110% of the width Ws' of the opposing sidewall. In another aspect of the disclosed tire, each sidewall of the tire has a maximum width, as measured from the tire equatorial plane (EP) to the radially outer surface of the tire sidewall. The maximum width of the one sidewall is radially outward of the maximum width of the opposing sidewall. In another aspect of the disclosed invention, the tire is further characterized by the sidewall insert in one sidewall having different physical characteristics than the sidewall insert in the opposing sidewall. In another aspect of the disclosed invention, the tire is further characterized by an additional reinforcing layer located in only one bead portion. The additional reinforcing layer may be a chipper, chafer, or flipper layer; being located inward of the turnup portions of the carcass reinforcing ply, outward of the turnup portion of the carcass reinforcing ply, along the outer surface of the bead, wrapped about the bead core, or adjacent to the bead apex. The additional reinforcing ply may be cord reinforced. Alternatively, the additional reinforcing layer may be a radial half carcass reinforcement ply wherein the half ply initiates in the tread region, under the belt structure, and extends into the bead region of the one sidewall, being turned about the bead core from either the axially inner side to the axially outer side or being turned about the bead core from the axially outer side to the axially inner side. In another aspect of the invention, the tire is further characterized by one sidewall having two sidewall inserts and the opposing sidewall having only one sidewall insert. In another aspect of the invention, the tire is further characterized by each bead portion comprising a bead core and an apex. The apex is located radially outward of the bead core and has a radially outward terminal point, wherein the terminal point of the apex in one bead portion is radially outward of the terminal point of the apex in the opposing bead portion. Alternatively, or in addition, the apex in one bead portion has different physical characteristics than the apex in the opposing bead portion. Also disclosed is an asymmetric run-flat pneumatic tire. The asymmetric tire has an equatorial plane (EP), a symmetrical tread profile, a pair of opposing bead portions, a pair of opposing sidewalls, at least one carcass reinforcing ply, a sidewall insert axially inward of at least one of the carcass reinforcing plies in each sidewall portion, and a belt structure located radially outward of the carcass reinforcing plies. The tire asymmetry is formed by the presence of an additional reinforcing layer located in only one bead portion, but not present in the opposing bead portion. In one aspect of this asymmetric tire, the additional reinforcing layer located in only one of the bead portion is selected from the following ply configuration of chafer, chipper, or flipper. The additional reinforcing layer may be cord reinforced. If so reinforced, the cords are inclined at angles in the range of 15° to 75° relative to the circumferential direction of the tire. Alternatively, the additional reinforcing layer may be a radial half carcass ply extending from beneath the belt structure to being turned up in the bead region. In another aspect of this asymmetric tire, each bead portion is further comprised of a bead core and a bead apex. To further enhance the asymmetrical nature of the tire, either the bead apex in one bead portion or the sidewall insert in one sidewall has different physical characteristics than the bead apex or the sidewall insert in the opposing bead portion or sidewall. In another aspect of the asymmetric tire, each bead portion is further comprised of a bead core and an apex, the apex being located radially outward of the bead core and having an radially outward terminal point. The terminal point of the apex in one bead portion is radially outward of the terminal point of the apex in the opposing bead portion. In any of the disclosed embodiments and aspects, the various features which create an asymmetry to the tire may be combined with any other feature that creates an asymmetry to the tire. Additionally, the tire sidewall may be marked to indicate which side of the tire is intended to be the outboard side of the tire so that, when mounting the tire on a negatively cambered suspension, the relatively stronger side of the tire is mounted as the outboard side of the tire.

The invention is further illustrated by the following non-limiting examples.

EXAMPLE 1

In this example, the use of high strength glass bubbles in a sidewall compound is demonstrated. Rubber compounds were mixed in a standard 2 step mixing procedure using components as shown in Table 1 and cured under standard cure conditions. Cured samples were tested for properties as shown in Table 2.

TABLE 1

| | control | |
|---|---|---|
| Sample No. | 1 | 2 |
| Natural Rubber | 50 | 50 |
| Polybutadiene | 50 | 50 |
| Carbon Black | 30 | 30 |
| Silica | 30 | 30 |
| Glass Bubbles[1] | 0 | 5 |
| Process Oil | 2 | 2 |
| Antidegradants | 7.5 | 7.5 |
| Tackifier Resin | 5 | 5 |
| Sulfur | 3 | 3 |
| Silane Coupler | 5 | 5 |
| Zinc Oxide | 1.9 | 1.9 |
| Accelerators | 2.5 | 2.5 |
| Calculated Specific Gravity | 1.145 | 1.118 |

[1]Scotchlite S60/18000 glass bubbles from 3M with crush strength of 18,000 psi and true density of 0.60 g/cc.

TABLE 2

| Sample No. | 1 | 2 |
|---|---|---|
| RPA Base 150C | | |
| G' 10% | 1398 | 1496 |
| Tan Delta 10% | 0.131 | 0.13 |
| ATS | | |
| 200% Modulus, MPa | 3.4 | 3.3 |
| 300% Modulus, MPa | 6.6 | 6.1 |
| Tensile, MPa | 13.4 | 13.6 |
| Elongation, % | 534 | 571 |
| RT Hardness | 63.4 | 64.5 |
| RT Rebound | 45.5 | 45.1 |
| Measured Specific Gravity | 1.143 | 1.114 |

Inventive sample 2 show a substantial reduction in specific gravity as compared with the control sample 1 and essentially agreement between calculated and measured specific gravities, indicating survival of essentially all of the glass bubbles during mixing. Sample 2 further showed physical properties comparable to the control.

EXAMPLE 2

In this example, the use of high strength glass bubbles in a sidewall insert compound is demonstrated. Rubber compounds were mixed in a standard 2 step mixing procedure using components as shown in Table 3 and cured under standard cure conditions. Cured samples were tested for properties as shown in Table 4.

TABLE 3

| | Control | |
|---|---|---|
| Sample No. | 3 | 4 |
| Natural Rubber | 80 | 80 |
| Polybutadiene | 20 | 20 |
| Carbon Black | 60 | 60 |
| Silica | 5 | 5 |
| Glass Bubbles[1] | 0 | 5 |
| Oil | 4.25 | 4.25 |
| Tackifier Resins | 3.5 | 3.5 |
| Fatty Acid | 1 | 1 |
| Antidegradants | 3.25 | 3.25 |
| Silane Coupler | 1 | 1 |
| Sulfur | 1 | 1 |
| Zinc Oxide | 2.75 | 2.75 |
| Accelerators | 2.5 | 2.5 |
| Sulfur | 8 | 8 |
| Calculated SG | 1.178 | 1.15 |

[1]Scotchlite S60/18000 glass bubbles from 3M with crush strength of 18,000 psi and true density of 0.60 g/cc.

TABLE 4

| Sample No. | 3 | 4 |
|---|---|---|
| RPA Base 150C | | |
| G' 10% | 3497 | 2938 |
| Tan Delta 10% | 0.072 | 0.077 |
| ATS | | |
| 200% Modulus, MPa | 12.8 | 11.9 |
| Elongation, % | 238 | 219 |
| Tensile, MPa | 14.7 | 12.1 |
| Hardness (RT) | 71.5 | 73.4 |
| Rebound (RT) | 57.2 | 57.6 |
| Rebound (100C) | 70.0 | 70.0 |
| Measured Specific Gravity | 1.178 | 1.153 |

Inventive sample 4 show a substantial reduction in specific gravity as compared with the control sample 3 and essentially agreement between calculated and measured specific gravities, indicating survival of essentially all of the glass bubbles during mixing. Sample 4 further showed physical properties comparable to the control.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic runflat tire, the tire having an equatorial plane (EP), a pair of opposing bead portions, a pair of opposing sidewalls, at least one carcass reinforcing plies, a sidewall insert axially inward of at least one of the carcass reinforcing plies in each sidewall portion, and a belt structure located radially outward of the carcass reinforcing plies, the tire being characterized by the bead portions being symmetrically distanced from the equatorial plane (EP) of the tire, and the tread on each side of the equatorial plane (EP) having different radius of curvature and different widths with the tread curvature on one side of the equatorial plane (EP) defined by continually decreasing radii of curvature, the widths being measured perpendicular to the equatorial plane (EP) to a line tangent to the maximum width of the belt structure, the sidewall insert comprising a rubber composition comprising at least one diene based elastomer and from about 1 to about 40 phr of glass bubbles having a crush strength of at least 10,000 psi as measured by ASTM D3102-78 in glycerol.

2. The pneumatic runflat tire of claim 1 wherein said glass bubbles have a crush strength of at least 18,000 psi as measured by ASTM D3102-78 in glycerol.

3. The pneumatic runflat tire of claim 1 wherein said glass bubbles are present in a concentration range of from 3 to 30 phr.

4. The pneumatic runflat tire of claim 1 wherein said glass bubbles have a particle size distribution of 10 percent by weight of 15 microns or less, 50 percent by weight of 30 microns or less, 90 percent by weight of 55 microns or less, and 95 percent by weight of 65 microns or less.

5. The pneumatic runflat tire of claim 1 wherein said glass bubbles have a particle size distribution of 10 percent by weight of 11 microns or less, 50 percent by weight of 30 microns or less, 90 percent by weight of 50 microns or less, and 95 percent by weight of 60 microns or less.

6. The pneumatic runflat tire of claim 1 wherein said glass bubbles have 1 percent or less by weight of particles with a size greater than 149 microns.

* * * * *